United States Patent
Lupski

(10) Patent No.: US 8,763,311 B2
(45) Date of Patent: Jul. 1, 2014

(54) SNOW INHIBITING DEVICE FOR A SOLAR-PANELED ROOF

(75) Inventor: Timothy J. Lupski, Hicksville, NY (US)

(73) Assignee: PC Support Services, Inc., Hicksville, NY (US)

( * ) Notice: Subject to any disclaimer, the term of this patent is extended or adjusted under 35 U.S.C. 154(b) by 0 days.

(21) Appl. No.: 13/451,601

(22) Filed: Apr. 20, 2012

(65) Prior Publication Data

US 2013/0276381 A1 Oct. 24, 2013

(51) Int. Cl.
*E04D 13/00* (2006.01)

(52) U.S. Cl.
USPC .............................. 52/26; 52/173.1

(58) Field of Classification Search
USPC ............... 52/24, 25, 26, 173.1; 248/519, 523, 248/520; D8/373, 499
See application file for complete search history.

(56) References Cited

U.S. PATENT DOCUMENTS

| | | | |
|---|---|---|---|
| 3,296,750 A * | 1/1967 | Zaleski | 52/24 |
| 4,141,182 A * | 2/1979 | McMullen | 52/24 |
| D254,051 S * | 1/1980 | Zaleski | D8/499 |
| 4,763,450 A * | 8/1988 | Daniel | 52/24 |
| 5,044,130 A * | 9/1991 | Chiddister | 52/24 |
| 5,343,659 A | 9/1994 | Zaleski | |
| 5,349,791 A * | 9/1994 | Zaleski | 52/24 |
| 5,371,979 A * | 12/1994 | Kwiatkowski et al. | 52/24 |
| 5,570,557 A * | 11/1996 | Kwiatkowski et al. | 52/630 |
| 5,613,328 A * | 3/1997 | Alley | 52/25 |
| 5,706,609 A * | 1/1998 | Heino | 52/24 |
| 5,732,513 A * | 3/1998 | Alley | 52/25 |
| 5,901,507 A | 5/1999 | Smeja et al. | |
| 5,943,826 A | 8/1999 | Totin | |
| 6,223,477 B1 * | 5/2001 | Alley | 52/24 |
| 6,266,929 B1 | 7/2001 | Cline | |
| D511,451 S * | 11/2005 | Mullane | D8/499 |
| D512,303 S * | 12/2005 | Prichard et al. | D8/499 |
| 6,996,938 B1 * | 2/2006 | Mullane | 52/24 |
| 7,174,677 B1 * | 2/2007 | Dressler | 52/26 |
| 7,516,576 B1 * | 4/2009 | Mullane | 52/24 |
| D610,443 S * | 2/2010 | Fisher | D8/499 |
| 7,997,032 B2 * | 8/2011 | Riley et al. | 52/24 |
| 2004/0221886 A1 | 11/2004 | Oono | |

* cited by examiner

*Primary Examiner* — Chi Q Nguyen
(74) *Attorney, Agent, or Firm* — Hunton & Williams LLP

(57) ABSTRACT

A snow-inhibiting device for inhibiting the movement of snow and ice on a solar-paneled roof. The device includes a base adapted for attachment to the surface of a roof. A planar guard member is securely attached to the surface of the base. The planar guard member has a proximal and distal end, where the proximal end is adjacent to the base, and the distal end projects away from the base. The distal end projects to a height greater than the height of the surface of a solar panel on the roof.

6 Claims, 4 Drawing Sheets

Fig. 3
Fig. 3a
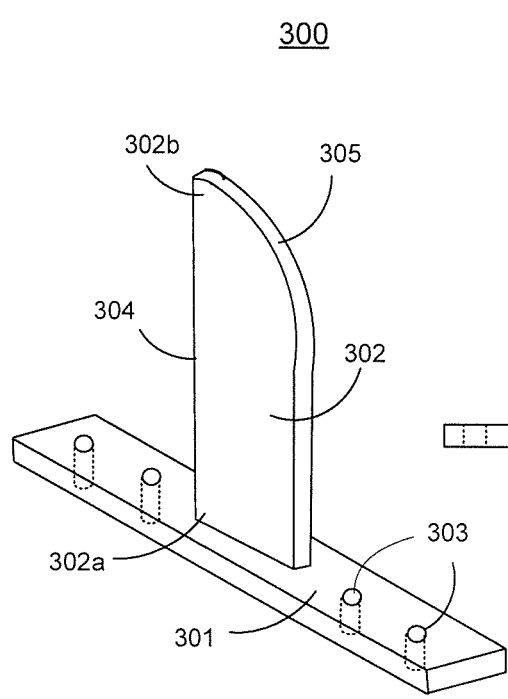
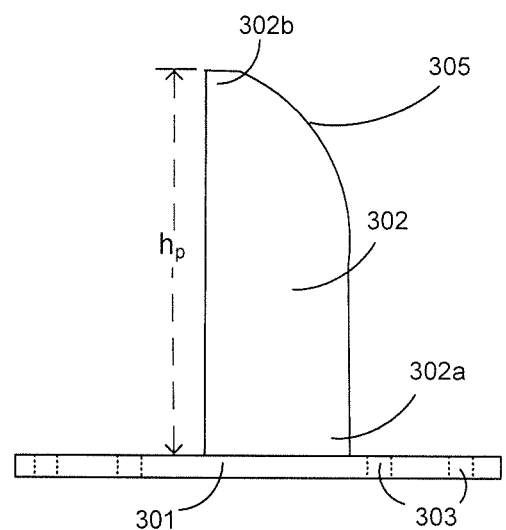

SNOW INHIBITING DEVICE FOR A SOLAR-PANELED ROOF

FIELD OF THE INVENTION

The present invention relates to a device for inhibiting the movement of snow and ice on a solar-paneled roof.

BACKGROUND OF THE INVENTION

Solar panels are becoming an increasingly efficient and cost-effective way to provide power to private residences, commercial enterprises, and industrial buildings. Homes and businesses that utilize solar panels often place the panels on the roof of the building being powered by the panels. The panels may be parallel with the roof or tilted at an angle, depending on the position of the sun. In colder climates, snowfall can collect and accumulate on the solar panels on a roof in the same manner that snow fall would collect and build up on the bare roof of a home or business without solar panels. Depending on the conditions, the snow may harden or freeze into ice.

As the weather changes, the snow or ice on the solar panels will begin to melt. If the panels rest on a tilted roof, the melting snow or ice may slide off the panels. This falling snow and ice can land on the ground below, causing damage to property positioned below the roof—such as lawn furniture or automobiles—or people who may be standing or walking below the edge of the roof. Ice and snow also tends to melt faster on a solar paneled roof because there is typically a small gap of air between the panels and the roof below, depending on the means used to mount the panels to the roof. Furthermore, because the panels are typically dark glass, they retain heat even when the temperatures are below freezing.

SUMMARY OF THE INVENTION

As solar panels have become an increasingly common way for both commercial and residential buildings to meet their energy needs, there exists a need in the art far a snow inhibiting device that is specifically suited for breaking up pieces of snow and ice that accumulate on the surface of a solar panel and then slide towards the ground as they melt.

Various exemplary embodiments provide for a snow inhibiting device that attaches to a sloped roof having at least one solar panel mounted on the surface of the roof. As a frame of reference, the solar panel's lower edge is the edge furthest from the apex of the roof and has a lower edge height that is measured perpendicularly from the surface of the roof to the surface of the solar panel. The snow inhibiting device has a base adapted for attachment to the roof surface and a planar guard member extending away from the base. The planar guard member is securely attached to the surface of the base and extends to a height greater than the lower edge height of the solar panel. The planar guard member and the base may be integrally joined as a single unitary piece. The base may be adapted to attach to the roof. For example, the base may attach to the roof using lag screws. The planar guard member and the base may be made of a corrosion-resistant material. For example, the planar guard member and the base may be made of aluminum. The planar guard member may have a sharpened leading edge that faces the lower edge of the solar panel. In this way, the snow inhibiting device can break up pieces of snow and ice that may accumulate on the surface of the solar panel and then slide off towards the ground as they melt.

BRIEF DESCRIPTION OF THE DRAWINGS

The present disclosure, together with further objects and advantages, may best be understood by reference to the following description taken in conjunction with the accompanying drawings, in the several Figures of which like reference numerals identify like elements, and in which:

FIG. 3 depicts an exemplary embodiment of a snow inhibiting device having a rounded edge.

DETAILED DESCRIPTION OF EXEMPLARY EMBODIMENT(S)

Figure 1:
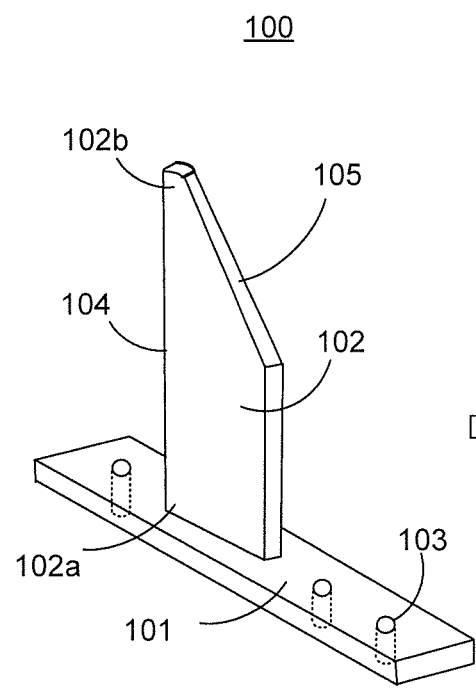
FIG. 1 depicts an exemplary embodiment for a snow inhibiting device.

The following description is intended to convey a thorough understanding of the embodiments described by providing a number of specific embodiments and details involving a device for inhibiting snow-movement on a solar paneled roof. It should be appreciated, however, that the present invention is not limited to these specific embodiments and details, which are exemplary only. It is further understood that one possessing ordinary skill in the art, in light of known devices, would appreciate the use of the invention for its intended purposes and benefits in any number of alternative embodiments, depending on specific design and other needs.

Various exemplary embodiments may provide a device for inhibiting the movement of snow and ice on a solar-paneled roof. As described in reference to FIG. 1, a snow inhibiting device 100 having a base 101 and a planar guard member 102. The base 101 may be adapted for attachment to a roof surface. In the non-limiting embodiment shown in FIG. 1, the base 101 has a rectangular shape. While a rectangular shape is shown for illustration, other shapes and variations may be used. The base may be adapted to attach to the surface of a roof via attachment holes 103. For example, the base 101 may attach to a roof via attachment holes 103 using one or more lag screws 103a that pass through attachment holes 103 and into the roof below. The lag screws 103a may be based on the type of mounting system used to attach the solar panels to the roof. For example, if the solar panels are mounted using a Unirac® racking system, the snow inhibiting device may be attached using 4" lag screws.

The planar guard member 102 may have a proximal end 102a and a distal end 102b. The proximal end 102a may be securely attached to the base 101. Distal end 102b may project away from the surface of the base 101 to a height $h_p$, as shown in FIG. 1a. FIG. 1a is a side view of the device depicted in FIG. 1. Height $h_p$ may be measured from the top of the base 101 to the distal end 102b. Planar guard member 102 may have a leading edge 104. The leading edge 104 may be sharpened. Also, the leading edge 104 may be rounded.

Figure 1A:
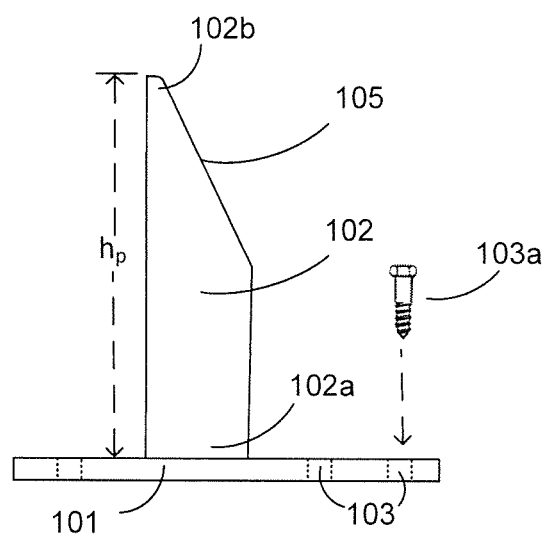

As depicted in non-limiting FIG. 1, planar guard member 102 may have a trailing edge 105. In this exemplary illustration, the trailing edge 105 may be straight and may have a taper to distal end 102b, making the proximal end 102a longer than the distal end 102b. Both the planar guard member 102 and the base 101 may be made of corrosion-resistant materials. For example, the planar guard member 102 and the base 101 may be made of aluminum. Other materials, such as stainless steel or polycarbonate may be used. The planar guard member 102 and the base 101 may be integrally joined as a unitary member.

Figure 1B:
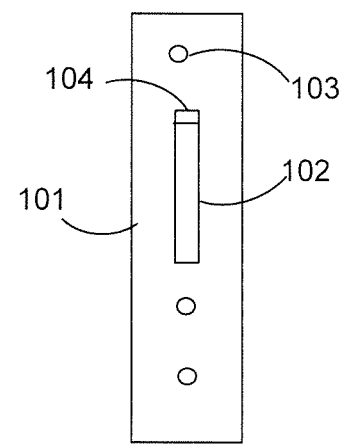

FIG. 1b is a top-down view of the device depicted in FIG. 1. In this exemplary embodiment, there are three attachment holes 103. The number and location of the attachment holes 103 may depend on a number of factors. For example, the number of holes 103 may be dependent on the size of the base, the height of the planar guard member, or the amount of snow or ice the snow inhibiting device is expected to encounter in operation. When device 100 is installed on a roof having solar panels, leading edge 104 may be facing the lower edge of the solar panel.

Figure 2:
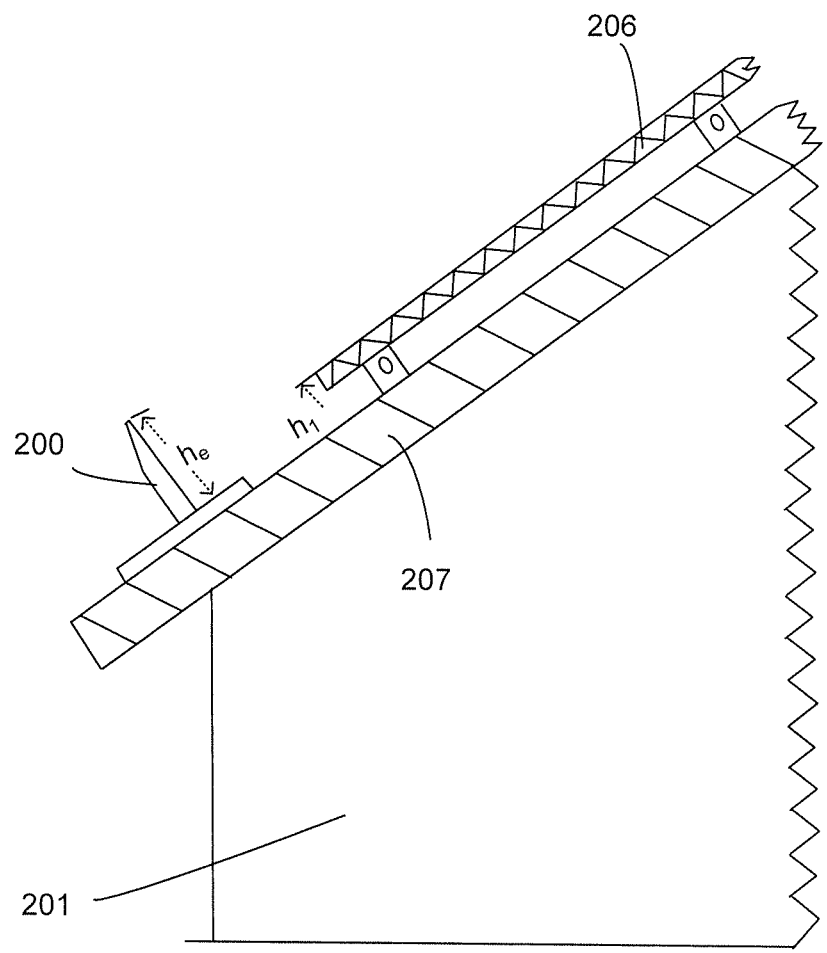
FIG. 2 depicts an exemplary embodiment of the snow inhibiting device of FIG. 1 installed on a solar-paneled roof.

FIG. 2 depicts an example of how the snow inhibiting device 200 may be installed on a roof 207 having a solar panel 206. In this exemplary embodiment, snow inhibiting device 200 corresponds to the embodiment depicted in FIGS. 1, 1a, and 1b. Snow or ice may accumulate on the surface of solar panel 206. The snow inhibiting device 200 may be installed between the lower edge of the roof 207 and the solar panel 206. The leading edge 104 of the snow inhibiting device may be adjacent to the solar panel 206. As shown in FIG. 2, snow inhibiting device 200 has a height $h_p$ measured from the surface of the base to the top of the distal end of the planar guard member. Solar panel 206 has a lower edge height $h_l$, measured perpendicularly from the surface of roof 207 to the top of the lower edge of solar panel 206. In this example, the snow inhibiting device height $h_p$ is greater than the lower edge height $h_l$. The difference between $h_p$ and $h_l$ may vary depending on the amount of snow the snow inhibiting device 200 is expected to encounter. For example, in climates that regularly experience heavy snowfall, the snow inhibiting device height $h_p$ may be at least 5 inches greater than the lower edge height $h_l$.

In operation, once snow and ice accumulate on the surface of solar panel 206, the snow and ice may begin to melt and slide towards the lower edge of the roof 207. As the pieces of snow and ice contact the snow inhibiting device, they may be broken up and interfered with. As a result, the larger pieces of snow and ice may be converted into smaller, lighter pieces that may then fall to the ground.

FIG. 3 depicts an alternative embodiment of a snow inhibiting device 300 having a base 301 and a planar guard member 302. The base 301 may be adapted for attachment to a roof surface. The base may be adapted to attach to the surface of a roof via attachment holes 303. For example, the base 301 may attach to a roof via attachment holes 303 using lag screws that pass through attachment holes 303 and into the roof below. The lag screws may be based on the type of mounting system used to attach the solar panels to the roof. For example, if the solar panels are mounted using a Unirac® racking system, the snow inhibiting device may be attached using 4" lag screws.

Figure 4:
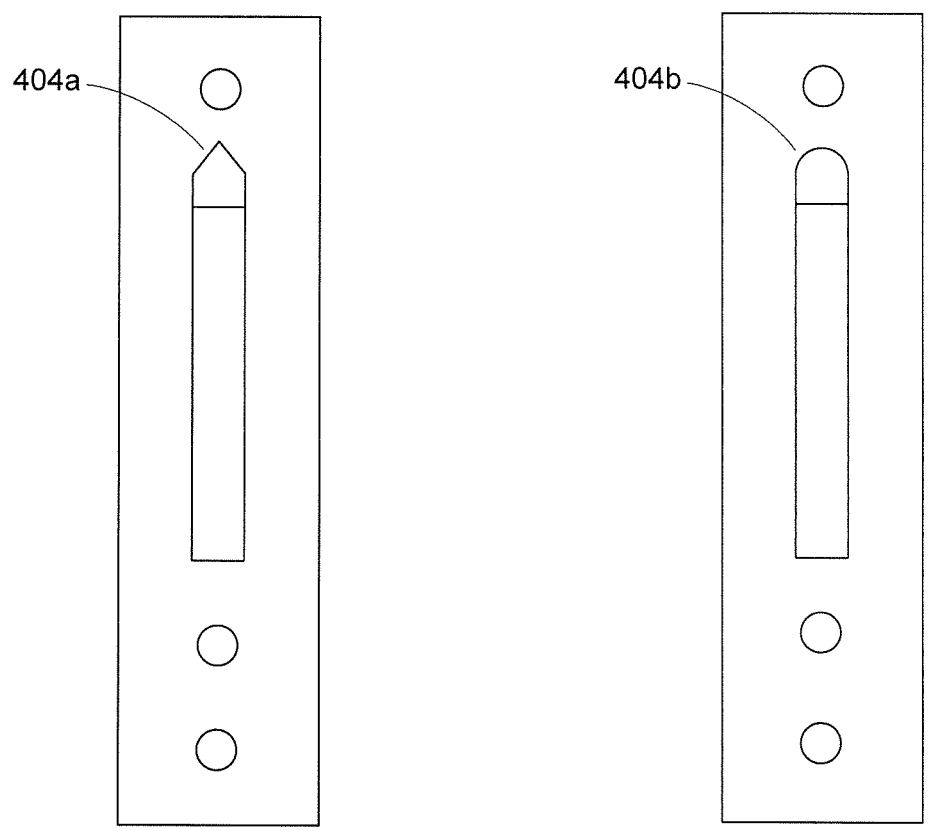
FIG. 4 depicts exemplary embodiments of a snow inhibiting device having a sharpened leading edge and a rounded leading edge.

The planar guard member 302 may have a proximal end 302a and a distal end 302b. The proximal end 302a may be securely attached to the base 301. Distal end 302b may project away from the surface of the base 301 to a height $h_p$ as shown in FIG. 3a. FIG. 3a is a side view of the device depicted in FIG. 3. Height $h_p$ may be measured from the top of the base 301 to the distal end 302b. Planar guard member 302 may have a leading edge 304. The leading edge 304 may be sharpened. Also, the leading edge 304 may be rounded. FIG. 4 depicts a top-down view of exemplary embodiments of snow inhibiting devices having a sharpened leading edge 404a (shown on the left), and a rounded leading edge 404b (shown on the right).

As depicted in non-limiting FIG. 3, planar guard member 302 has a trailing edge 305. The trailing edge 305 may be rounded in shape. Other shapes and variations may be realized. Both the planar guard member 302 and the base 301 may be made of corrosion-resistant materials. For example, the planar guard member 302 and the base 301 may be made of aluminum. The planar guard member 302 and the base 301 may be integrally joined as a unitary member.

The exemplary embodiment in FIG. 3 shows four attachment holes 303. The number and location of the attachment holes 303 may depend on a number of factors. For example, the number of holes 303 may be dependent on the size of the base, the height of the planar guard member, or the amount of snow or ice the snow inhibiting device is expected to encounter in operation. When device 300 is installed on a roof having solar panels, leading edge 304 may be facing the lower edge of the solar panel.

Accordingly, the embodiments of the present inventions are not to be limited in scope by the specific embodiments described herein. Further, although some of the embodiments of the present disclosure have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. For example, other embodiments of the present invention may be adaptable for use with larger solar-panel arrays on the roof of a train station, shopping mall, restaurant, or other commercial establishment. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

The invention claimed is:

1. A system for inhibiting snow on a sloped roof, comprising:
   at least one solar panel mounted to a surface of the roof, wherein a lower edge of the solar panel furthest from an apex of the roof has a lower edge height measured perpendicularly form the surface of the roof to the top of the lower edge; and
   at least one snow inhibiting device, comprising
      a base, adapted for attachment to the surface of the roof, and
      a planar guard member having a proximal end securely attached to a surface of the base and a distal end projecting away from the surface of the base, said planar guard member having a leading edge and a trailing edge, wherein at least a portion of the leading edge furthest from the base is configured to break up one or more sections of snow, wherein the at least a portion of the leading edge is one of sharpened or rounded, wherein the planar guard member projects from the surface from the base in a single plane to a height greater than the lower edge height of the at least one solar panel.

2. The system of claim 1, wherein the base and the planar guard member are integrally joined as a unitary member.

3. The system of claim 1, wherein the base is adapted to attach to the roof surface using lag screws.

4. The system of claim 1, wherein the base and the planar guard member are made of corrosion-resistant material.

5. The system of claim 4, wherein the corrosion-resistant material is aluminum.

6. The system of claim 1, wherein the trailing edge is tapered.

\* \* \* \* \*